(12) United States Patent
Farmer et al.

(10) Patent No.: US 8,958,198 B2
(45) Date of Patent: Feb. 17, 2015

(54) SUPER CAPACITOR WITH FIBERS

(71) Applicant: Lawrence Livermore National Security, LLC, Livermore, CA (US)

(72) Inventors: Joseph Collin Farmer, Tracy, CA (US); James Kaschmitter, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 192 days.

(21) Appl. No.: 13/648,925

(22) Filed: Oct. 10, 2012

(65) Prior Publication Data

US 2014/0098462 A1 Apr. 10, 2014

(51) Int. Cl.
*H01G 9/00* (2006.01)

(52) U.S. Cl.
USPC .......................................... 361/502

(58) Field of Classification Search
None
See application file for complete search history.

(56) References Cited

U.S. PATENT DOCUMENTS

| | | | |
|---|---|---|---|
| 5,260,855 A | 11/1993 | Kaschmitter et al. | |
| 5,626,977 A * | 5/1997 | Mayer et al. | 429/523 |
| 5,954,937 A | 9/1999 | Farmer | |
| 6,762,926 B1 | 7/2004 | Shiue et al. | |
| 2011/0183180 A1* | 7/2011 | Yu et al. | 429/128 |
| 2012/0052400 A1* | 3/2012 | Kim et al. | 429/339 |
| 2012/0236467 A1* | 9/2012 | Kang et al. | 361/502 |
| 2014/0030590 A1* | 1/2014 | Wang et al. | 429/211 |

* cited by examiner

*Primary Examiner* — Dion R Ferguson
(74) *Attorney, Agent, or Firm* — Eddie E. Scott

(57) ABSTRACT

An electrical cell apparatus includes a first current collector made of a multiplicity of fibers, a second current collector spaced from the first current collector; and a separator disposed between the first current collector and the second current collector. The fibers are contained in a foam.

7 Claims, 9 Drawing Sheets

SUPER CAPACITOR WITH FIBERS

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to capacitors and more particularly to a super capacitor.

2. State of Technology

U.S. Pat. No. 5,260,855 for a supercapacitors based on carbon foams provides the following state of technology information. "The supercapacitor according the present invention can be assembled from a variety of elements. The preferred embodiments incorporate, in various combinations, electrodes, electrical contacts to a power supply, cell and/or electrode separators, environmental seals, and an electrolyte. In general, the elements are desirably lightweight and chemically stable with respect to the electrolyte used within the supercapacitor. The electrodes of the supercapacitor are desirably carbon aerogels. Compared to materials used in conventional electrodes, the aerogels are very lightweight, having densities between about 0.3-0.9 g/cc, and have high surface areas, about 400-1000 m.sup.2/g. These characteristics of the aerogel contribute minimally to the weight of the supercapacitor and, taken together with the aerogel's electrochemical properties, optimize its capacitance"

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an electrical cell apparatus having a first current collector made of a multiplicity of fibers, a second current collector spaced from the first current collector; and a separator disposed between the first current collector and the second current collector. The fibers are contained in a foam. In one embodiment the foam is an aerogel. In another embodiment the foam is an xerogel. In another embodiment the foam is a carbon nanotube foam. In one embodiment the fibers are nanowires. In another embodiment the fibers are nanotubes.

The present invention overcomes problems including poor potential distribution and shelf shielding, the need for depositing perfect dielectric layers, and the size limitations associated with sputter deposition on planar substrates. The present invention is designed around easy to replicate and easy-to-scale materials, such as large bricks of conductive foam and coated fibers, that can be woven and wrapped. Furthermore, capacitors of virtually any form factor can be built.

The present invention has use in load leveling, uninterruptable power for computing and telecommunications, electric vehicles, hybrid electric vehicles, airplanes, naval ships, ground vehicle, and power for military bases and communications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
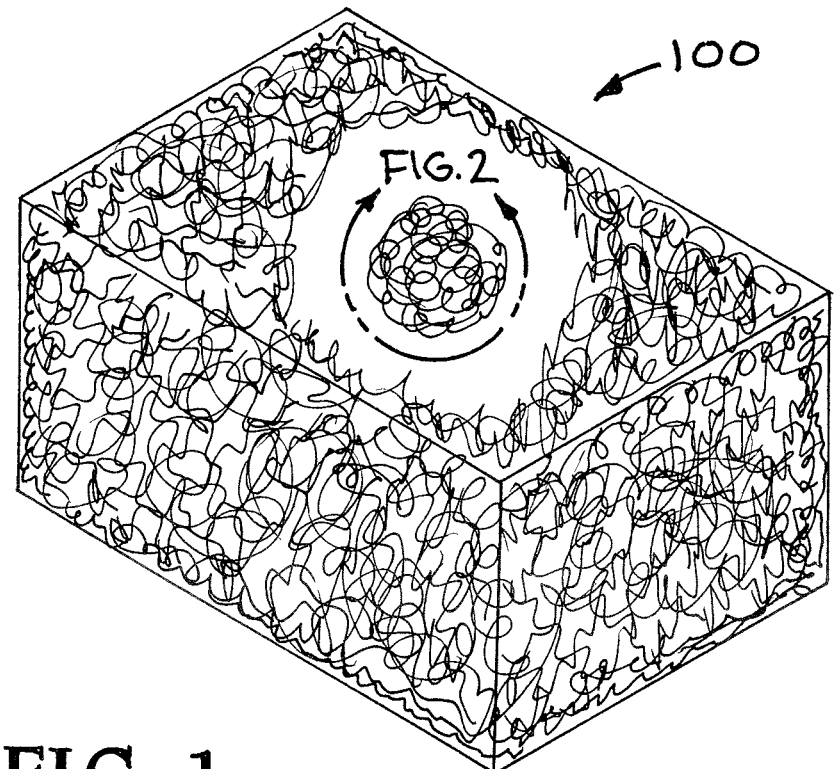
FIG. 1 illustrates an aerogel monolith that contains a multiplicity of conductive fibers.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The present invention provides an electrical cell apparatus having a first current collector made of a multiplicity of fibers, a second current collector spaced from the first current collector; and a separator disposed between the first current collector and the second current collector. The fibers are contained in a foam. In one embodiment the present invention provides a supercapacitor. The supercapacitor includes at least two electrodes that are spaced apart defining an opening therebetween. At least one of the two electrodes is formed of a multiplicity of conductive fibers. The conductive fibers form the current conductor in this super-capacitor. This fiber-type current collector can be made of a wide variety of conductive materials, including but not limited to carbon, silicon-carbide, other metal carbides, metals and metallic alloys, or conductive polymers. Here too the specific surface area of the conductive fiber can be enhanced before application of the dielectric coating, through application of a high-surface area conductive coating. Nanowires and conductive nanotubes can also be used. This dielectric layer can be formed from carbon-based polymers, silicon-based polymers, metal oxides, or any other high-integrity dielectric material. When woven or wrapped with a second un-coated conductive fiber, a fabric is formed with two current collectors and a dielectric separation. By orienting the two types of fibers in different directions, all fibers of a particular type (dielectric coated or un-coated) can be collected into a single bundle, thereby forming a single electrical connection. For example, coated fibers might be oriented to run north-to-south, while un-coated fibers might be oriented to run east-to-west. A dielectric solvent or binder is then injected into the spaces between the two types of fibers, thereby forming a dielectric continuum between the two conductive fibers. A capacitor of this type has many advantages, that include: (1) redundancy of current paths, so that the failure (break) of a single fiber would not result in failure of the entire capacitor; (2) a single short between two crossing or parallel fibers would result in localized fusing, without failure of the entire capacitor stack, assuming that a robust high-temperature dielectric coating is used to coate the first fiber, and to fill the space between fibers; (3) infinitely variable form factor, with the ability to wrap capacitive fiber elements around a wide variety of shapes and objects, including spheres, cylinders, cones, body panels, air foils, and prismatic shapes.

The present invention overcomes problems including poor potential distribution and shelf shielding, the need for depositing perfect dielectric layers, and the size limitations associated with sputter deposition on planar substrates. The present invention is designed around easy to replicate and easy-to-scale materials, such as large bricks of conductive foam and coated fibers, that can be woven and wrapped. Furthermore, capacitors of virtually any form factor can be built.

Additional information, descriptions, and details of the present invention will become apparent for the descriptions of various examples which follow. The examples serve to explain the principles of the invention. The invention is susceptible to modifications and alternative forms. The invention is not limited to the particular examples disclosed. The invention covers all modifications, equivalents, and alternatives falling within the spirit and scope of the invention as defined by the claims.

Example 1

Conductive Fibers Current Collector

Referring now to the drawings and in particular to FIGS. 1-7, one embodiment of a supercapacitor of the present invention is illustrated. This embodiment provides a supercapacitor that includes at least two electrodes that are spaced apart defining an opening therebetween. The opening contains a dielectric. At least one of the two electrodes is formed of a multiplicity of conductive fibers. The multiplicity of conductive fibers is encased in an aerogel monolith. The multiplicity of conductive fibers have a dielectric coating. A conductive material is infused in the aerogel monolith around the conductive fibers with a dielectric coating. The conductive fibers provide the first electrode of the supercapacitor and the conductive material infused in the aerogel monolith provides the second electrode of the supercapacitor. The dielectric coating provides a separator between the first electrode and the second electrode.

As illustrated in FIG. 1, an aerogel monolith 100 contains a multiplicity of conductive fibers. Each of the conductive fibers has a dielectric coating. A portion of the aerogel monolith 100 is illustrated in greater detail in FIG. 2. The FIG. 2 portion is designated by the double headed arrows and "FIG. 2" in the aerogel monolith 100 in the view illustrated in FIG. 1.

Figure 2:
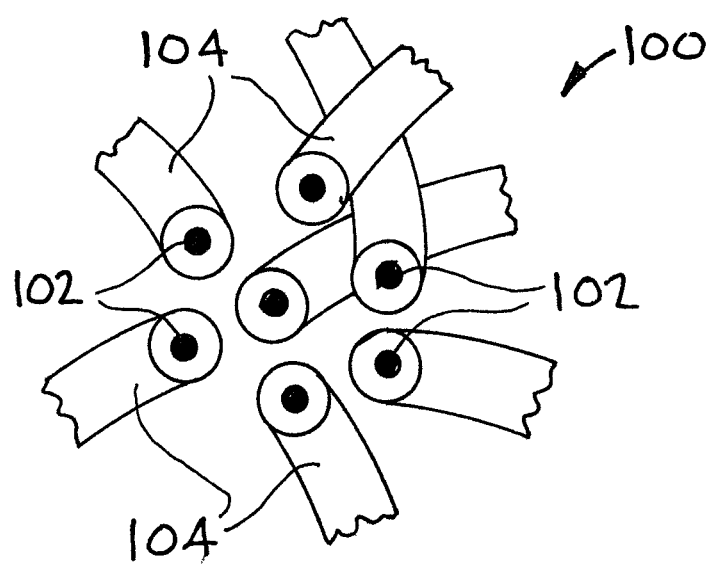
FIG. 2 illustrates that the conductive fibers are coated with a dielectric coating.

As illustrated in FIG. 2, each of the conductive fibers 102 has a dielectric coating 104. The conductive fibers 102 with a dielectric coating 104 are imbedded throughout the aerogel monolith 100.

Figure 3:
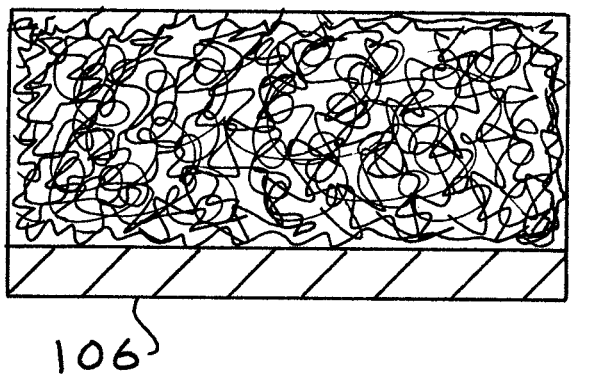
FIG. 3 shows the bottom of the aerogel monolith with a potted layer.

As illustrated in FIG. 3, the bottom of the aerogel monolith 100 has a potted layer 106. The potted layer is formed using a non-electrical conductive material such as a non-electrical conductive epoxy infused into the bottom of the aerogel monolith 100.

Figure 4:
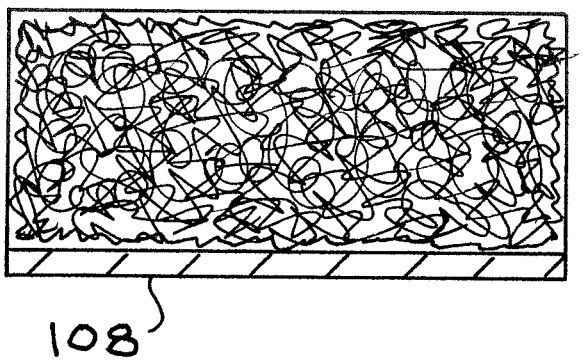
FIG. 4 illustrates a plane operation used to produce a planned surface on the potted layer on the aerogel monolith.

As illustrated in FIG. 4, a plane operation has been used to produce a planned surface 108. Note that the thickness of the potted layer 106 has been reduced by the planning operation.

Figure 5:
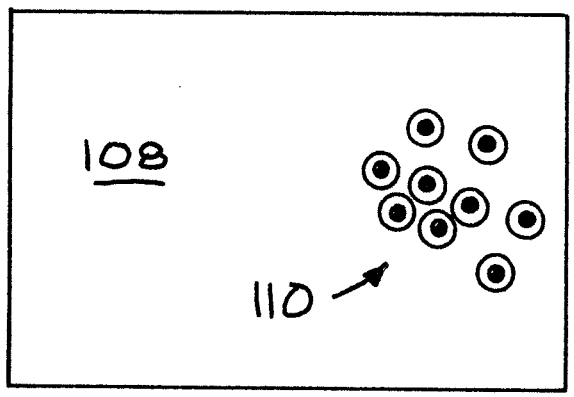
FIG. 5 shows that the planned surface exposes the conductive fibers with the dielectric coating.

As illustrated in FIG. 5, the planned surface exposes the conductive fibers 102 with the dielectric coating 104. FIG. 5 is a view of the bottom of the aerogel monolith 100 with the planned surface 108. The exposed conductive fibers shown on the planned surface 108 with the dielectric coating are designated by the reference numeral 110.

Figure 6:
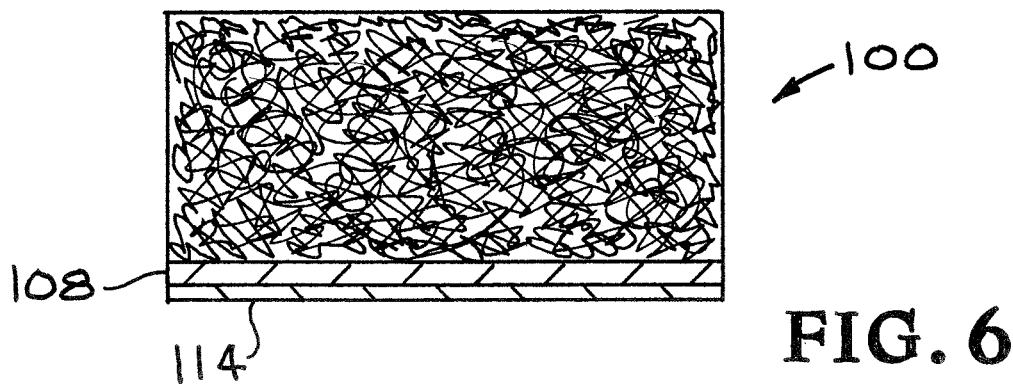
FIG. 6 illustrates that a conductive coating has been applied over the exposed planed surface.

As illustrated in FIG. 6, a conductive coating 114 has been applied over the exposed planed surface 108. The conductive coating 114 makes an electrical connection with the conductive fibers 102 to produce the first electrode of the supercapacitor.

Figure 7:
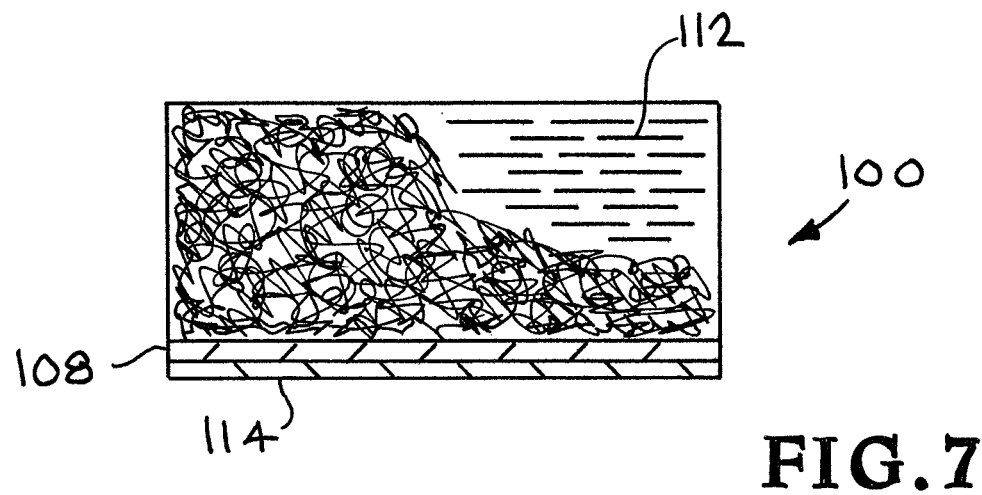
FIG. 7 shows that a conductive material has been infused in the aerogel monolith.

As illustrated in FIG. 7, a conductive material 112 has been infused in the aerogel monolith 100. This may be accomplished by infusing liquid metal into the aerogel monolith 100. Alternatively, this may be accomplished by infusing molten metal into the aerogel monolith 100 and allowing the molten metal to solidify. The conductive material 112 that has been infused in the aerogel monolith 100 provides the second electrode of the supercapacitor.

Referring again to FIGS. 1-7, the supercapacitor of the present invention will be described in greater detail. The supercapacitor includes two electrodes that are spaced apart defining an opening therebetween. The opening contains a dielectric. The first electrode is formed of a multiplicity of conductive fibers 102. The multiplicity of conductive fibers 102 are each coated with a dielectric coating 104. The dielectric coating 104 provides the dielectric in the space between the two electrodes. The multiplicity of conductive fibers 102 are extend throughout the aerogel monolith 100 avoiding the "self shielding" problem of the prior art supercapacitors. The conductive material 112 that is infused in the aerogel monolith around the conductive fibers 102 and dielectric coating 104 provides the second electrode of the supercapacitor.

Method of Making Conductive Fibers Current Collector

Figure 8:
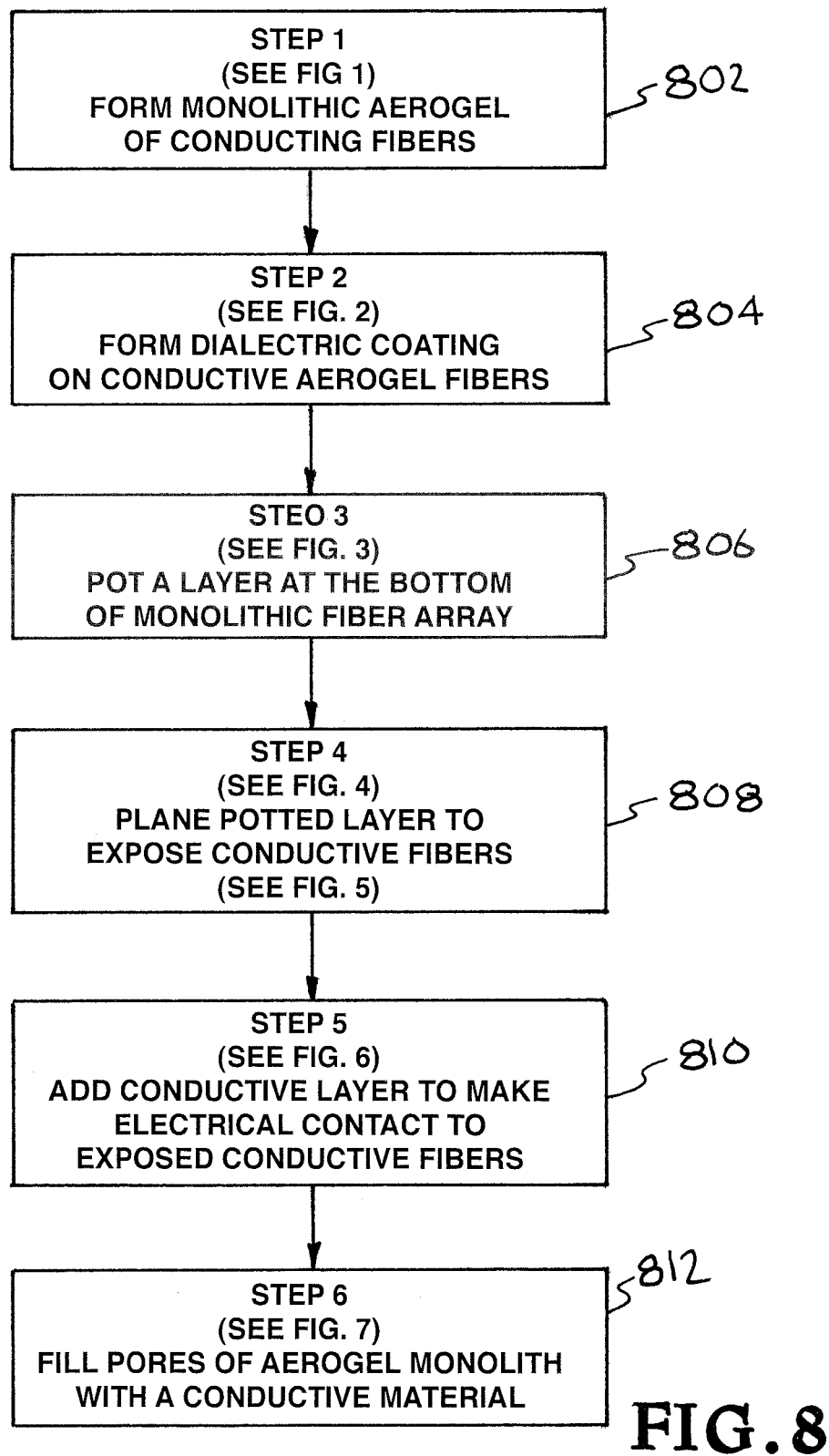
FIG. 8 is a flowchart illustrating one embodiment of a supercapacitor of the present invention.

Referring now to FIG. 8, a flow chart illustrates one embodiment of a supercapacitor of the present invention. The flow chart is designated generally by the reference numeral 800. The flow chart 800 illustrates the steps in producing a supercapacitor of the present invention. This supercapacitor includes at least two electrodes that are spaced apart defining an opening therebetween. The opening contains a dielectric. At least one of the two electrodes is formed of a multiplicity of conductive fibers. The multiplicity of conductive fibers are encased in an aerogel monolith. The multiplicity of conductive fibers have a dielectric coating. A conductive material is infused in the aerogel monolith around the conductive fibers with a dielectric coating. The conductive fibers provide the first electrode of the supercapacitor and the conductive material infused in the aerogel monolith provides the second electrode of the supercapacitor. The dielectric coating provides a separator between the first electrode and the second electrode. The steps for producing a supercapacitor of the present invention are described below.

In step 1 designated by the reference numeral 802, an aerogel monolith is formed containing a multiplicity of conductive fibers. The conductive fibers are imbedded throughout the aerogel monolith.

In step 2 designated by the reference numeral 804, a dielectric coating is produce coating the conductive fibers.

In step 3 designated by the reference numeral 806, a potted layer is formed on the bottom of the aerogel monolith. The potted layer is formed using a non-electrical conductive material such as a non-electrical conductive epoxy infused into the bottom of the aerogel monolith.

In step 4 designated by the reference numeral 810, a plane operation is used to produce a planed surface on the potted layer. This reduces the thickness of the potted layer.

In step 5 designated by the reference numeral 812, a conductive coating is been applied over the exposed planed surface of the potted layer. The conductive coating makes an electrical connection with the conductive fibers to produce the first electrode of the supercapacitor.

In step 6 designated by the reference numeral 814, a conductive material is infused into the aerogel monolith. The conductive material that is infused into the aerogel monolith provides the second electrode of the supercapacitor.

Example 2

Double Coated Conductive Fibers Current Collector

Referring now to the drawings and in particular to FIGS. 9-17, a second embodiment of a supercapacitor of the present is illustrated. This embodiment provides a supercapacitor that includes at least two electrodes that are spaced apart defining an opening therebetween. The opening contains a dielectric. At least one of the two electrodes is formed of a multiplicity of conductive fibers. The multiplicity of conductive fibers are encased in an aerogel monolith. The multiplicity of conductive fibers have a first coating. The first coating is a dielectric coating. The conductive fibers provide the first electrode of the supercapacitor. The dielectric coating provides a separator between the first electrode and the second electrode. The second electrode is produce by a second coating place over the first coating. The second coating is of a conductive material and provides the second electrode of the supercapacitor.

Figure 9:
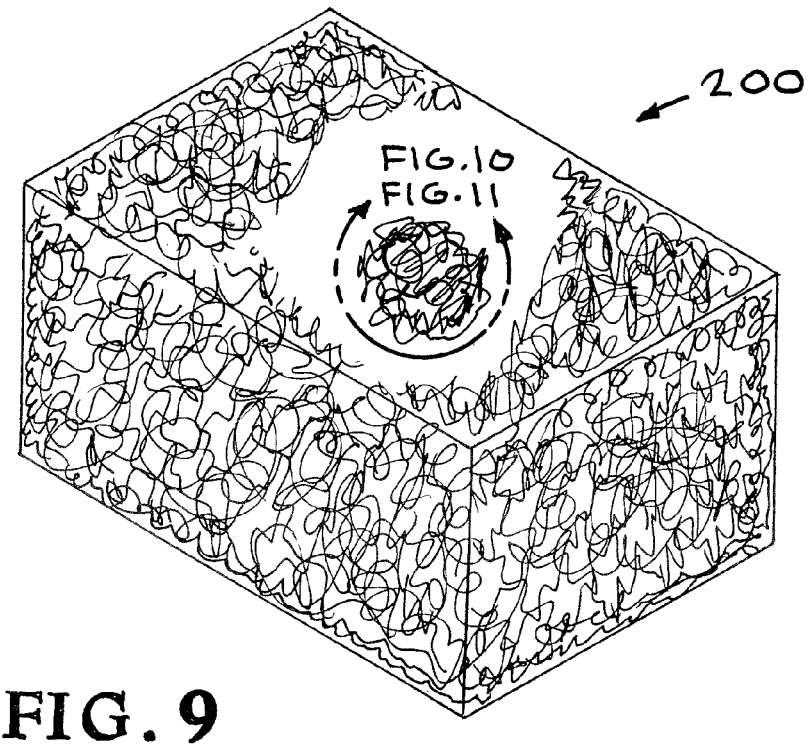
FIG. 9 illustrates an aerogel monolith that contains a multiplicity of conductive fibers.

As illustrated in FIG. 9, an aerogel monolith 200 contains a multiplicity of conductive fibers. Each of the conductive fibers has a dielectric coating. A portion of the aerogel monolith 200 is illustrated in greater detail in FIG. 10. The FIG. 10 portion is designated by the double headed arrows and "FIG. 10" in the aerogel monolith 200 in the view illustrated in FIG. 9.

Figure 10:
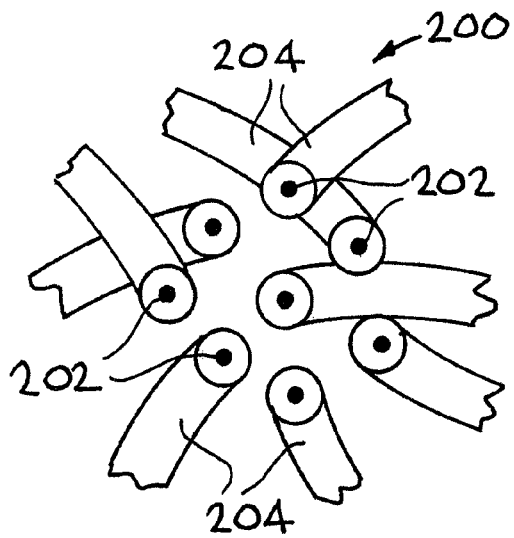
FIG. 10 illustrates that the conductive fibers are coated with a dielectric coating.

As illustrated in FIG. 10, each of the conductive fibers 202 has a dielectric coating 204. The conductive fibers 202 with a dielectric coating 204 are imbedded throughout the aerogel monolith 200.

Figure 11:
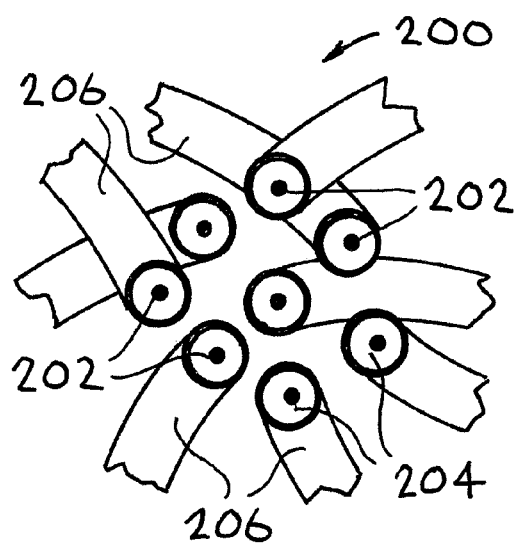
FIG. 11 illustrates that the conductive fibers coated with a dielectric coating are in turn coated with a conductive coating.

As illustrated in FIG. 11, a second coating 206 of a conductive material is provided over the first dielectric coating 204. The provides second coating 206 of a conductive material the second electrode of the supercapacitor.

Figure 12:
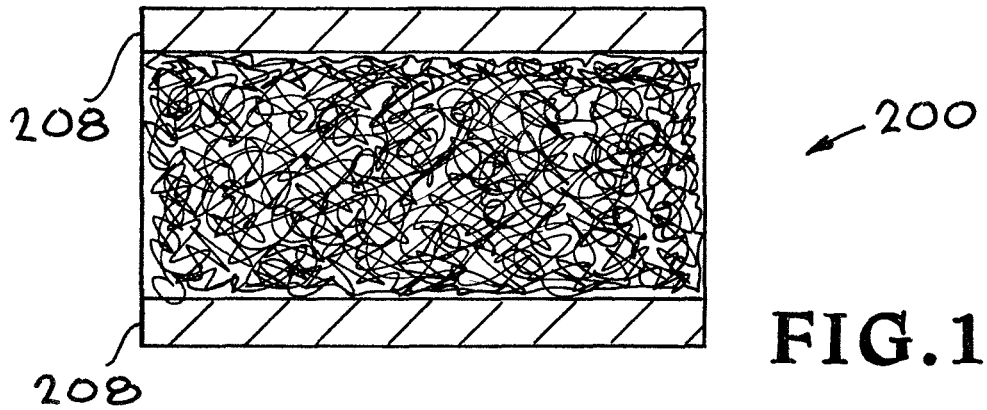
FIG. 12 shows the bottom and top of the aerogel monolith with potted layers.

As illustrated in FIG. 12, the bottom and the top of the aerogel monolith 200 have potted layers 208. The potted layers 208 are formed using a non-electrical conductive material such as a non-electrical conductive epoxy infused into the bottom and top of the aerogel monolith 200.

Figure 13:
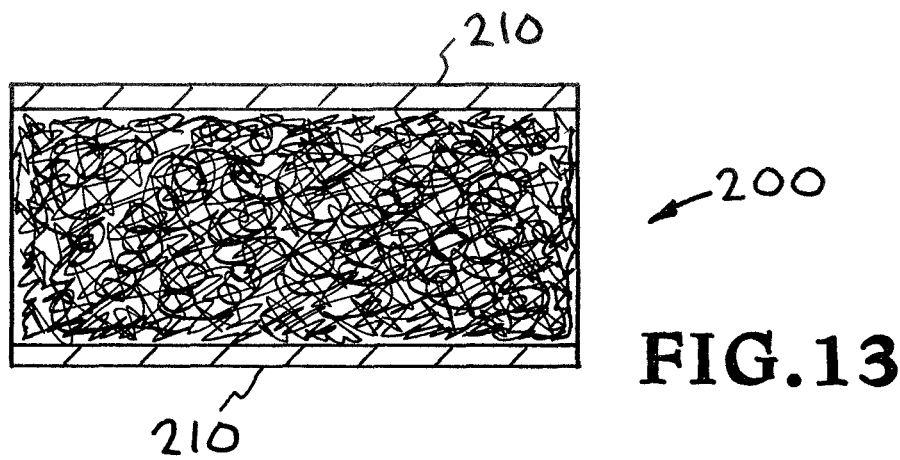
FIG. 13 illustrates a plane operation used to produce a planned surface on the potted layers on the aerogel monolith.

As illustrated in FIG. 13, a plane operation has been used to produce planed surface 210 on the top and on the bottom potted layers 208. Note that the thickness of the potted layers 206 has been reduced by the planning operation.

Figure 14:
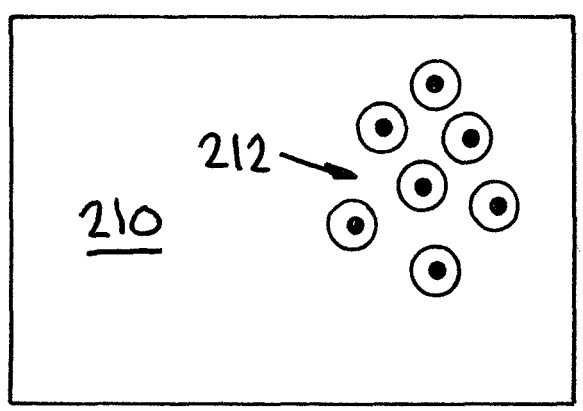
FIG. 14 shows that the planned surface exposes the conductive fibers with the dielectric coating.

As illustrated in FIG. 14, the planned surfaces 210 expose the conductive fibers with the dielectric coating. FIG. 14 is a view of the bottom of the aerogel monolith 200 with the planned surface 210. The exposed conductive fibers with the first dielectric coating are shown on the planned surface 210 and are designated by the reference numeral 212.

Figure 15:
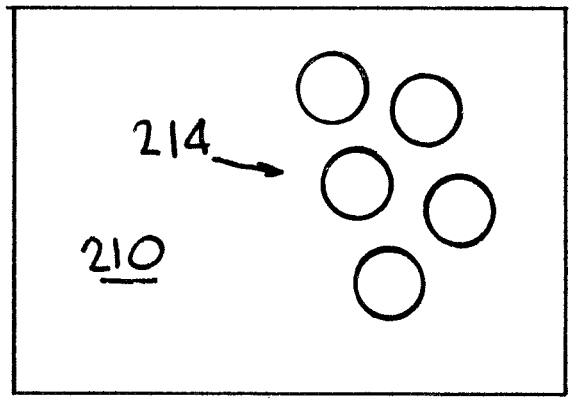
FIG. 15 shows that the planned surface exposes the conductive coating.

As illustrated in FIG. 15, the planned surfaces 210 expose the second conductive coating. FIG. 15 is a view of the top of the aerogel monolith 200 with the planned surface 210. The exposed second conductive coating are shown on the planned surface 210 and are designated by the reference numeral 214.

Figure 16:
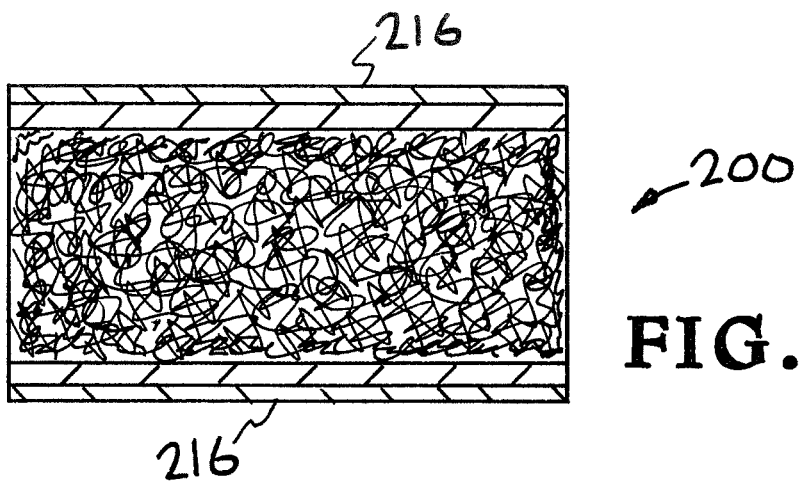
FIG. 16 illustrates that a metal layer has been applied over the exposed planed surface.
Figure 17:
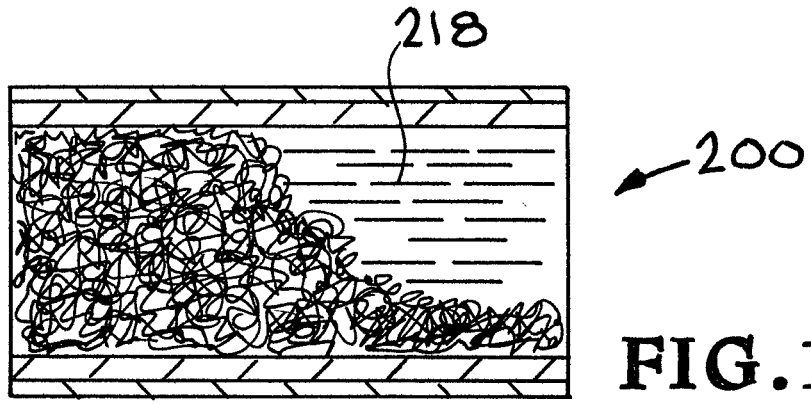
FIG. 17 shows that a conductive material has been infused in the aerogel monolith.

As illustrated in FIG. 16, a conductive coating has been applied over the exposed planed surface. The conductive coating 216 makes an electrical connection with the conductive fibers 202 to produce the first electrode of the supercapacitor.

Referring again to FIGS. 9-17, the supercapacitor of the present invention will be described in greater detail. The supercapacitor includes two electrodes that are spaced apart defining an opening therebetween. The opening contains a dielectric. The first electrode is formed of a multiplicity of conductive fibers 202. The multiplicity of conductive fibers 202 are each coated with a dielectric coating 204. The dielectric coating 204 provides the dielectric in the space between the two electrodes. The multiplicity of conductive fibers 202 are extend throughout the aerogel monolith 200 avoiding the "self shielding" problem of the prior art supercapacitors. A second coating of conductive material 206 covers the dielectric coating 204 and provides the second electrode of the supercapacitor.

Method of Making Double Coated Conductive Fibers Current Collector

Figure 18:
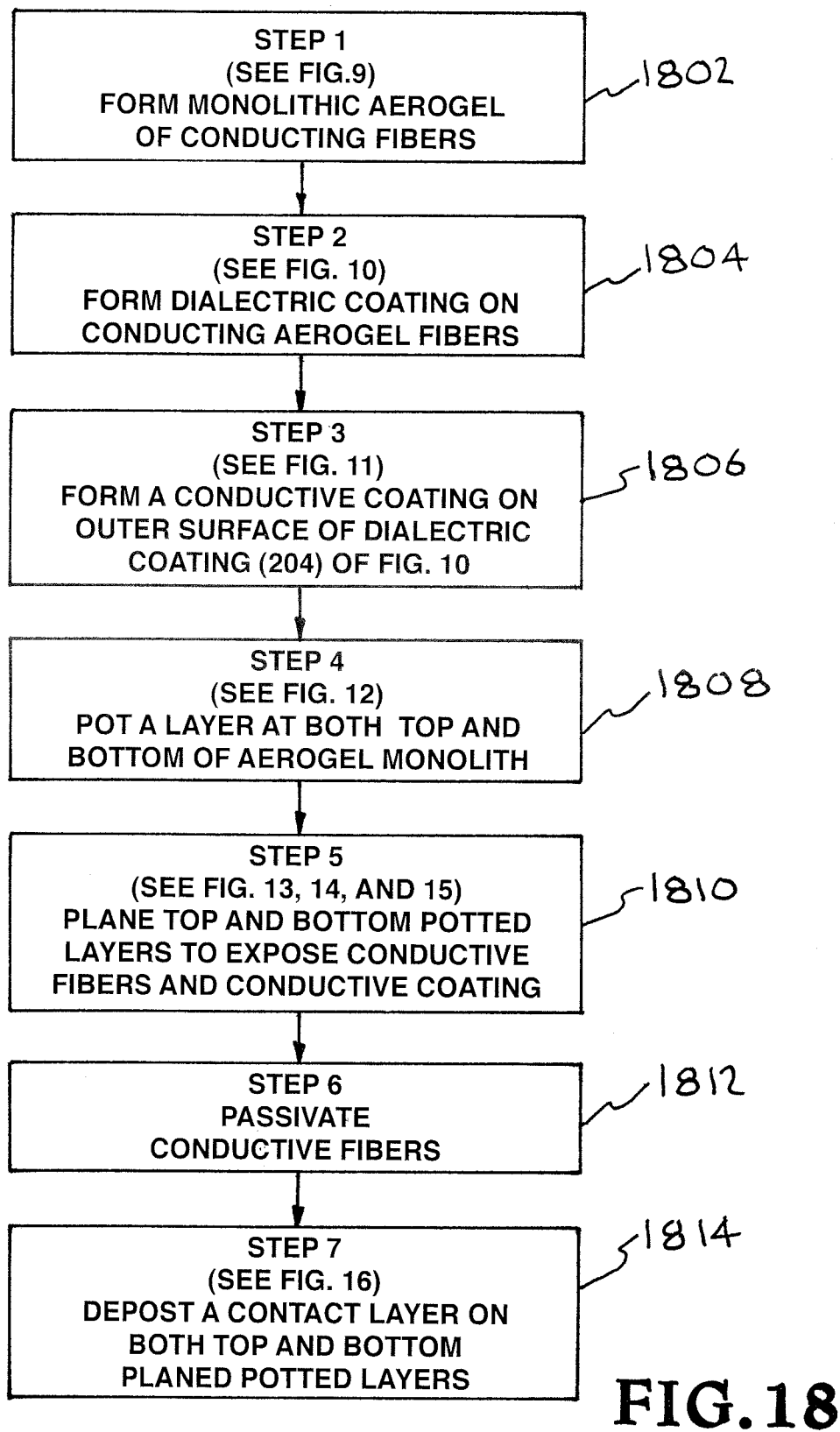
FIG. 18 is a flowchart illustrating another embodiment of a supercapacitor of the present invention.

Referring now to FIG. 18, a flow chart illustrates another embodiment of a supercapacitor of the present invention. The flow chart is designated generally by the reference numeral 1800. The flow chart 1800 illustrates the steps in producing a supercapacitor of the present invention. This supercapacitor includes at least two electrodes that are spaced apart defining an opening therebetween. The opening contains a dielectric. One of the two electrodes is formed of a multiplicity of conductive fibers. The multiplicity of conductive fibers are encased in an aerogel monolith. The multiplicity of conductive fibers are coated with a dielectric coating. The dielectric coating provides a separator between the first electrode and the second electrode. A second coating is provided over the first coating. The second coating of conductive material provides the second electrode of the supercapacitor. The steps for producing the second embodiment of a supercapacitor of the present invention are described below.

In step 1 designated by the reference numeral 1802, an aerogel monolith is formed containing a multiplicity of conductive fibers. The conductive fibers are imbedded throughout the aerogel monolith.

In step 2 designated by the reference numeral 804, a dielectric coating is produce coating the conductive fibers.

In step 3 designated by the reference numeral 1804, a conductive coating is applied over the first coating of dielectric material. The second layer of conductive coating provides the second electrode of the supercapacitor.

In step 4 designated by the reference numeral 1806, a potted layer is formed on the bottom of the aerogel monolith and also on the top of the aerogel monolith. The potted layers are formed using a non-electrical conductive material such as a non-electrical conductive epoxy infused into the bottom of the aerogel monolith.

In step 5 designated by the reference numeral 1810, a plane operation is used to produce planed surfaces on the potted layers. This reduces the thickness of the potted layers.

In step 6 designated by the reference numeral 1812, the conductive fibers are passivated to provide a non-conducting cover to the conductive fibers.

In step 7 designated by the reference numeral 1814, a conductive coating is applied over the exposed planed surfaces of the potted layers on the top and on the bottom of the aerogel monolith. The conductive coating on the bottom layer makes an electrical connection to produce the supercapacitor. The conductive coating on the top layer makes an electrical connection without connection to the conductive fibers and to the second layer of conductive material to produce the supercapacitor.

Example 3

Coated Fiber Capacitor

A capacitor is formed by coating conductive fibers with a dielectric coating. The conductive fiber forms the current conductor in this super-capacitor element, which has cylindrical geometry. This fiber-type current collector can be made of a wide variety of conductive materials, including but not limited to carbon, silicon-carbide, other metal carbides, metals and metallic alloys, or conductive polymers. Here too the specific surface area of the conductive fiber can be enhanced before application of the dielectric coating, through application of a high-surface area conductive coating. Nanowires and conductive nanotubes can also be used. This dielectric layer can be formed from carbon-based polymers, silicon-based polymers, metal oxides, or any other high-integrity dielectric material. When woven or wrapped with a second un-coated conductive fiber, a fabric is formed with two current collectors and a dielectric separation. By orienting the two types of fibers in different directions, all fibers of a particular type (dielectric coated or un-coated) can be collected into a single bundle, thereby forming a single electrical connection. For example, coated fibers might be oriented to run north-to-south, while un-coated fibers might be oriented to run east-to-west. A dielectric solvent or binder is then injected into the spaces between the two types of fibers, thereby forming a dielectric continuum between the two conductive fibers. A capacitor of this type has many advantages, that include: (1) redundancy of current paths, so that the failure (break) of a single fiber would not result in failure of the entire capacitor; (2) a single short between two crossing or parallel fibers would result in localized fusing, without failure of the entire capacitor stack, assuming that a robust high-temperature dielectric coating is used to coate the first fiber, and to fill the space between fibers; (3) infinitely variable form factor, with the ability to wrap capacitive fiber elements around a wide variety of shapes and objects, including spheres, cylinders, cones, body panels, air foils, and prismatic shapes.

Example 4

Three-Dimensional Monolithic Capacitor

The first super-capacitor architecture uses reticulated vitreous carbon (RVC) or metallic foam as one of the two current collectors for the construction of a capacitor with very high capacitance. The specific area of the RVC or metallic foam can be increased through the deposition of conductive, powder-like coatings over the surface of the foam. Once the desired specific area has been achieved, the conductive area of this foam can then be covered with a non-conductive dielectric film, thereby forming the dielectric layer in the capacitor. All conductive surfaces are coated, with the exception of the face that will be used to make electrical contact with the first current collector. This dielectric layer can be formed from carbon-based polymers, silicon-based polymers, metal oxides, or any other high-integrity dielectric material. The dielectric coating on the surface of the RVC or metal foam can then be coated with a second layer having metallic conduction, thereby forming the second current collector in this three-dimensional capacitor structure. Alternatively, the second current collector can be formed by flooding the dielectric-lined pores of the RVC or metallic foam with a liquid conductive phase, such as a low-melting metal or eutectic alloy. Flooding can be accomplished by flow from any face of the monolithic three-dimensional structure, except for the face that enables electrical conduction to the inner current collector. The capacitor can then be encapsulated with a protective dielectric layer by dip-coating, or some other acceptable method. The dielectric and conductive layers on the internal surfaces of the porous RVC or metallic foam can be deposited by any number of methods, including but not limited to chemical vapor deposition, direct-current and radio-frequency magnetron sputtering, dip coating, electroplating, electroless plating, plasma polymerization, deposition of a metal layer followed by oxidation or anodization, or other appropriate method.

Example 5

Energy Conversion & Storage Monoliths, Wraps and Fabrics

The coated fiber approach can also be used to construct fuel cells (see previous disclosure), photovoltaics, thermoelectric devices, as well as primary and secondary batteries. Similarly, the monolithic approach can also be used to build the same types of energy conversion and storage devices.

Synthesis of Porous Conductive Structures: Any number of processes can be used to make the three-dimensional structures described above. For example, the classic processes for the production of reticulated vitreous carbon foams, using either polystyrene beads as pore formers, or compressed polyurethane foams, can be used. In both cases, the conductive carbon phase is formed through pyrolysis. A second method includes the deposition of a metallic coating onto a porous dielectric structure with chemical or physical vapor deposition, or sputtering for cases where the porous substrate is not too deep. A conductive alloy can be injected into the interstitial volume formed by another powder that serves as a mandrel that can be selectively dissolved. For example, aluminum could be used as a pore former with silver or copper, and then dissolved with KOH. Polystyrene beads can be coated with the desired metal, fused into a monolithic block, with removal of the polystyrene at high temperature, or dissolution into a liquid solvent. Many other pore replication processes also exist.

Smart Detection Cloths: If the individual conductive fibers are kept separate, each capacitive pair can be used as a large-array sensor. Such cloths could also be used for capacitive sensing applications, such as the detection of incoming photons, ions, ballistics and projectiles, depending upon the dielectric coating and filler used. Two layers of such a fabric, if used to construct a double wall canvas screen, and might be able to determine the direction of incoming shots from snipers and other sources.

Example 6

Method of Making Electric Cell

An electric cell is produced by forming a monolith containing a multiplicity of conductive fibers embedded in a foam. The foam can be an aerogel foam, and xerogl foam, a carbon nanotube foam, or other type of foam. The multiplicity of conductive fibers extending throughout the foam. The conductive fibers are coated with a dielectric coating to produce coated conductive fibers. A potted layer is formed on the bottom of the monolith using a non-electrical conductive material. A planning operation is used to produce a planned surface on the potted layer on the bottom of the monolith. A conductive coating is applied over the planed surface of the potted layer. A conductive material is infused into the monolith. The conductive fibers form one electrode of the electric cell and the conductive material forms the other electrode of the electric cell.

Example 6

Method of Making Double Coated Coductor Electric Cell

An electric cell is produced by forming a monolith containing a multiplicity of conductive fibers embedded in a foam. The foam can be an aerogel foam, and xerogl foam, a carbon nanotube foam, or other type of foam. The multiplicity of conductive fibers extending throughout the foam. The conductive fibers are coated with a dielectric coating to produce coated conductive fibers. A potted layer is formed on the bottom of the monolith and on the top of the monolith using a non-electrical conductive material. A planning operation is used to produce a planned surface on the potted layer on the bottom and top of the monolith. The conductive fibers on the planned surface on the top of the monolith are passivated to form a non-electrical connecting cover on the conductive fibers. A conductive coating is applied over the planned surface of the potted layer on the top and on the bottom of the monolith. The inner conductive fibers form one electrode of the electric cell and the outer conductive layer forms the other electrode of the electric cell.

Prior Art "Self Shielding" Problem

Figure 19:
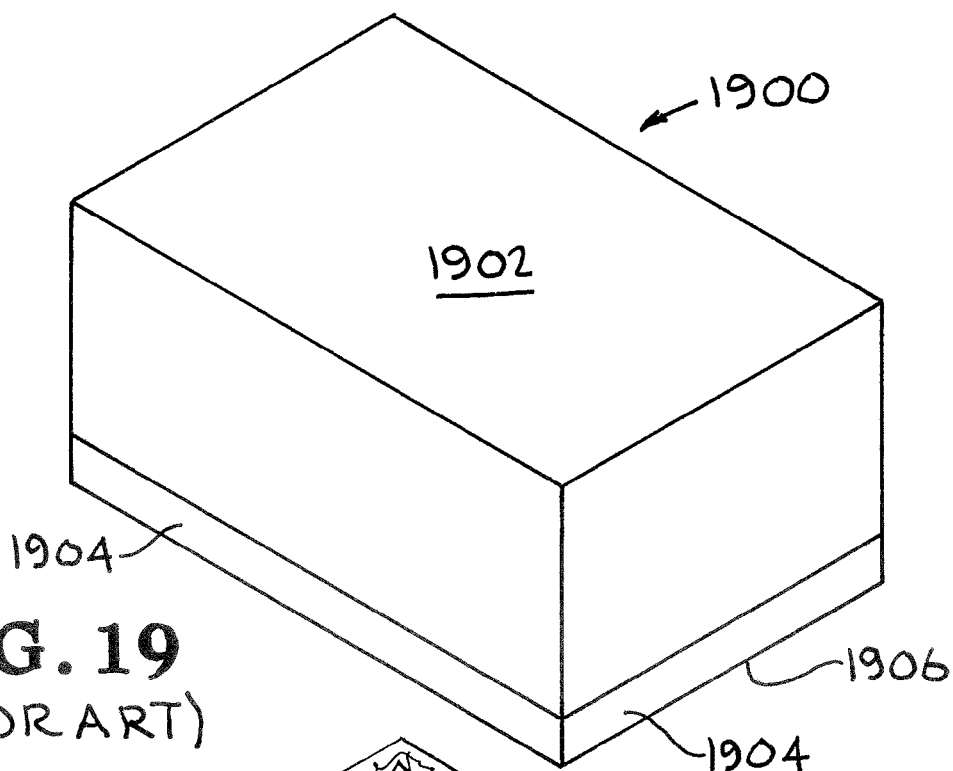
FIG. 19 illustrate the prior art "self shielding" problem.
Figure 20:
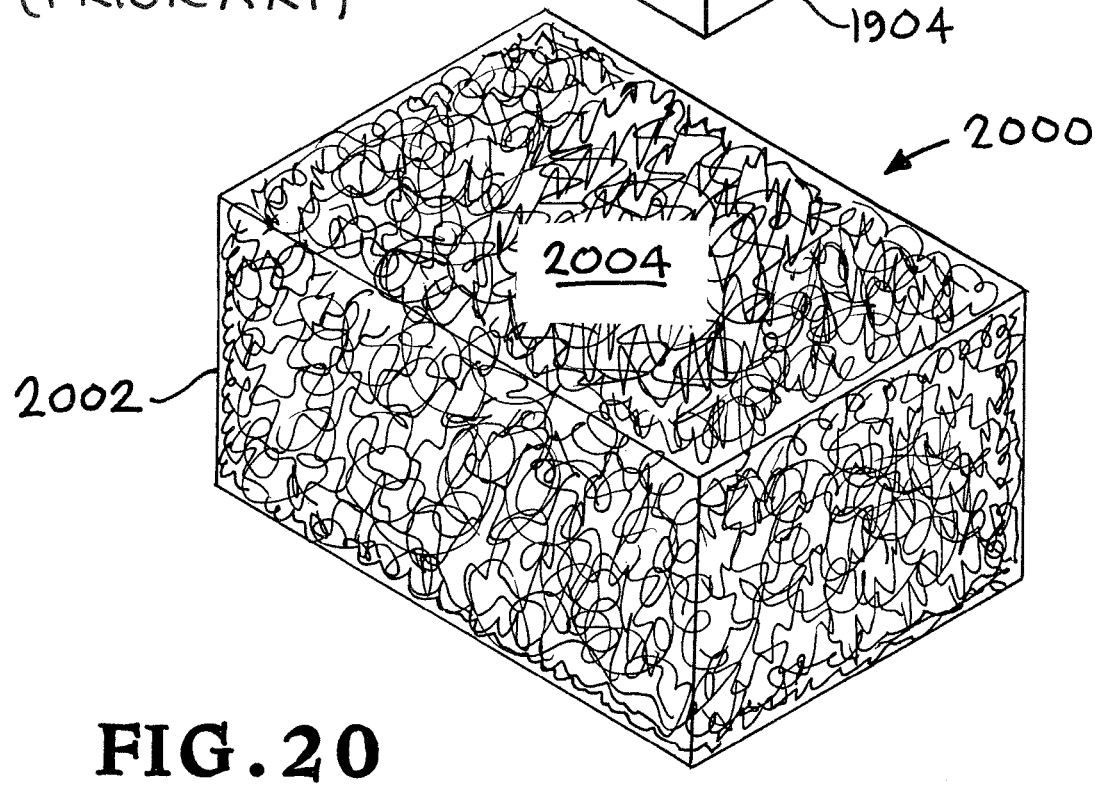
FIG. 20 show how the present invention solves the "self shielding" problem.

Referring now to FIG. 19 the Prior Art "self shielding" problem is illustrated. An aerogel electrode 1900 is illustrated in FIG. 19. With the body of the electrode 1900 being aerogel 1902. The problem of self shielding with aerogel electrodes results in only a small layer 1904 beneath the active surface 1906 of the electrode 1900 has conductivity. Since only the small portion 1904 of the electrode 1900 has conductivity the electrode 1900 is not as efficient as it could be. FIG. 20 show how the present invention solves the "self shielding" problem. In FIG. 20 the body of the electrode 2000 is an aerogel 2002 material with fibers 2004 infused throughout the the aerogel material 2002. This assures that the electrode 2000 has conductivity throughout the entire electrode 2000.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A supercapacitor apparatus, comprising:
a first electrode;
a second electrode, said first and said second electrodes spaced apart defining an open channel therebetween;
a monolith in said first electrode, said monolith including a multiplicity of electrical conductive fibers encased in said monolith;
a dielectric coating on said electrical conductive fibers;
a planned surface on said monolith, said planned surface exposing at least some of said electrical conductive fibers from said dielectric coating; and
a non-electrical potted layer infused into said planned surface of said monolith.

2. The supercapacitor apparatus of claim 1 wherein said electrical conductive fibers are encased in a foam in said monolith.

3. The supercapacitor apparatus of claim 2 wherein said foam is an aerogel.

4. The supercapacitor apparatus of claim 2 wherein said foam is an xerogel.

5. The supercapacitor apparatus of claim 2 wherein said foam is an aerogel foam and wherein said electrical conductive fibers are electrical conductive nanotubes encased in said aerogel foam.

6. The supercapacitor apparatus of claim 1 wherein said electrical conductive fibers are electrical conductive nanowires.

7. The supercapacitor apparatus of claim 1 wherein said electrical conductive fibers are electrical conductive nanotubes.

* * * * *